(12) United States Patent
Mooney et al.

(10) Patent No.: US 7,739,246 B2
(45) Date of Patent: Jun. 15, 2010

(54) SYSTEM AND METHOD OF MERGING CONTACTS

(75) Inventors: Stephen John Mooney, Seattle, WA (US); Melissa Dunn Wood, Woodinville, WA (US); Patanjali Srivatsa Venkatacharya, Seattle, WA (US); Oliver Griffith Fisher, Ottawa (CA)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 10/966,527

(22) Filed: Oct. 14, 2004

(65) Prior Publication Data

US 2006/0085483 A1 Apr. 20, 2006

(51) Int. Cl.
*G06F 7/00* (2006.01)
(52) U.S. Cl. .................................. 707/687; 707/758
(58) Field of Classification Search ................ 705/51; 707/3, 100, 102, 104.1, 201, 202
See application file for complete search history.

(56) References Cited

U.S. PATENT DOCUMENTS

| | | | | |
|---|---|---|---|---|
| 5,806,075 | A * | 9/1998 | Jain et al. | 707/201 |
| 6,718,336 | B1 * | 4/2004 | Saffer et al. | 707/102 |
| 6,732,123 | B1 * | 5/2004 | Moore et al. | 707/202 |
| 6,748,402 | B1 * | 6/2004 | Reeves et al. | 707/201 |
| 6,925,476 | B1 * | 8/2005 | Multer et al. | 707/200 |
| 2002/0116336 | A1 * | 8/2002 | Diacakis et al. | 705/51 |
| 2003/0088438 | A1 * | 5/2003 | Maughan et al. | 707/104.1 |
| 2003/0171942 | A1 * | 9/2003 | Gaito | 705/1 |
| 2004/0083297 | A1 * | 4/2004 | Gazzetta et al. | 709/229 |
| 2004/0128321 | A1 * | 7/2004 | Hamer | 707/104.1 |
| 2004/0167877 | A1 * | 8/2004 | Thompson, III | 707/3 |
| 2005/0033752 | A1 * | 2/2005 | Prager et al. | 707/100 |
| 2005/0102328 | A1 * | 5/2005 | Ring et al. | 707/201 |

OTHER PUBLICATIONS

Liberty J, "Sams Teach yourself C++ in 24 Hours", Aug. 2001, Sams Publishing, Third Edition.*

* cited by examiner

*Primary Examiner*—Tim T. Vo
*Assistant Examiner*—Jau-Shya Meng (57) ABSTRACT

A method of merging contact information received from multiple sources. The method includes acts of identifying a first data record including a first information content as representing a contact, identifying a second data record that has a second information content differing from the first data record and represents the contact, and merging the first data record and the second data record into a single contact record.

31 Claims, 10 Drawing Sheets

SYSTEM AND METHOD OF MERGING CONTACTS

CROSS REFERENCE TO RELATED APPLICATION

This application is related to co-pending U.S. patent application Ser. No. 10/692,164 filed Oct. 25, 2003.

BACKGROUND OF THE INVENTION

Contact stores are databases that, in conjunction with contact manager applications built on these databases, typically play an important role in a number of applications which require the retention of personal information, such as a name, e-mail address, telephone numbers, and the like. Multiple representations (duplicate records, partially conflicting records and the like) of the same person may often arise in a contact store. Contact stores might reside on multiple devices such as a single user computer system, portable consumer electronics, servers and the like. Contact stores provide a way to keep track of information associated with a person. Alternatively, a contact store may be part of a networked file server (or terminal server)computer system that multiple users or multiple types of computer devices can access. Users may have access to multiple contact stores. Multiple representations may arise from duplicate records or differing records originating on different devices coupled to a common file server.

Prior art conflict management software typically resolves duplicate contacts or contacts that are similar but contain differing information by deleting information. This type of software typically allows information that was entered last to prevail. A problem with the prior art software is that valid information that may be of value tends to be lost or erased.

For example if a person has two data records, with two different telephone numbers, one telephone number will typically be lost after performing the conflict resolution process, typically referred to as synchronizing or merging. In such a process a conflict is typically flagged to a user, and the user chooses which contact record, or portion of a contact record is retained. Frequently a computer user will realize that they have removed the wrong contact after the desired information has been lost.

The problems associated with synchronizing, or merging, multiple contacts are typically made worse when remotely created records, typically created by different electronic devices are merged back to a centralized contact store. For example a contact may be stored on a cellular telephone, and a PDA (personal digital assistant). A user might change the contact's information in one device but not the other. When merging is attempted some information that the user would like to keep may be lost. Also, synchronization methods for each device to the centralized contact store is typically a different procedure for each device having its own remotely stored the contacts.

SUMMARY OF THE INVENTION

The present invention therefore provides a method of synchronizing contact information received from multiple sources comprising the acts of identifying a first data record including a first information content as representing a contact, identifying a second data record, having a second information content differing from the first data record, and representing the contact, and merging the first data record and the second data record into a single contact record.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, wherein.

Like reference numerals are used to designate like parts in the accompanying drawings.

DETAILED DESCRIPTION OF THE INVENTION

The detailed description provided below in connection with the appended drawings is intended as a description of the embodiments of the invention and is not intended to represent the only forms in which the present invention may be constructed or utilized. The description sets forth the functions of the invention and the sequence of steps for constructing and operating the invention in connection with the illustrated embodiments. However, the same or equivalent functions and sequences may be accomplished by different embodiments that are also intended to be encompassed within the spirit and scope of the invention.

Although the present invention is described and illustrated herein as being implemented in a terminal server and desktop computer systems, the system described is provided as an example and not a limitation. As those skilled in the art will appreciate, the present invention is suitable for application in a variety of different types of personal, main-frame or distributed computer systems. For example a distributed computer system that allows a user to access a contact store through an internet connection is contemplated.

Figure 1:
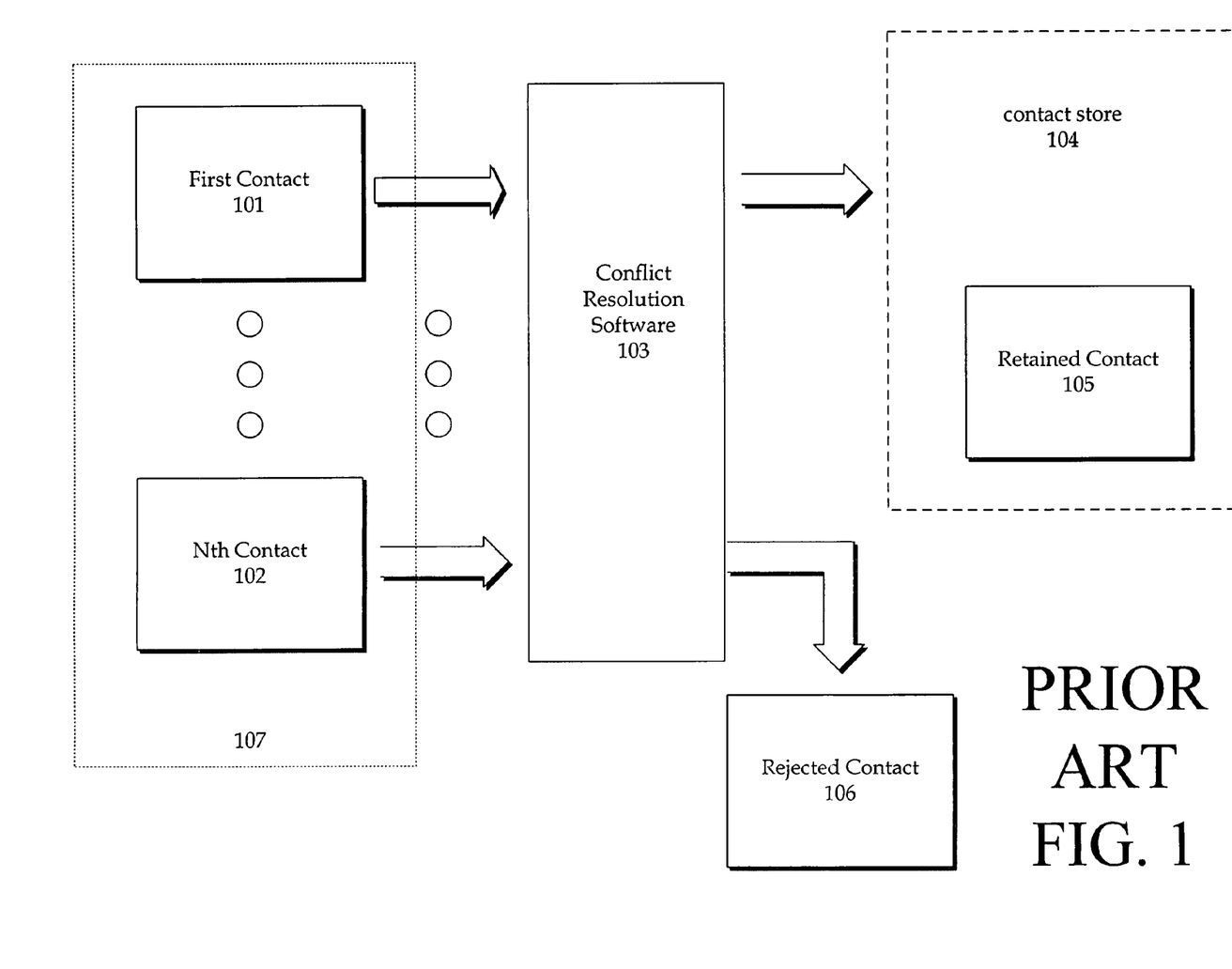
FIG. 1 is a block diagram illustrating a conventional method of resolving conflicts between contacts, or data records.

FIG. 1 is a block diagram illustrating a conventional method of resolving conflicts between contacts, or data records. It would be desirable to be able to retain, or remember the original information from before the merger and return it to its original location after a mistake has been realized. A contact is typically a single person, group, organization, or their equivalent. Contacts are typically stored in a database or store. Those skilled in the art will appreciate that a schema typically defines aspects of a database, such as contact storage parameters.

In a typical contact management system a number of data records 101, 102 form a collection of contacts 107 that will be compared 103 for retention in a contact store 104. Occasionally duplicate data records are entered, or different versions of a data record are stored for the same person. Such multiple representations of a person are typically referred to as conflicting or duplicate contacts. Conflict resolution software 103 typically attempts to resolve conflicts by picking from among the existing records keeping the most recent record 105, and rejecting earlier, or duplicate contacts 106. Comparison may be made contact by contact or field by field in a contact.

The most recent record is typically kept in a storage space, termed a contact store 104. The rejected contact 106 containing undesired or redundant information is discarded, or stored in an archive. Sometimes contacts that are discarded contain valuable information that the user has to copy over to the retained contact before deleting the rejected contact 106. Often the information is simply lost in the process. Occasionally a user will realize after deleting a contact that the wrong one was discarded. Typically the information deleted may not be retrieved. It would be desirable to have a way of truly merging the data from contacts that retains the unique data from the records being reconciled, and allows the merging operation to be undone. It would be desirable to have a common method of synchronizing or merging contacts from each of the devices such that substantially all of the information from the differing contact records is merged into a single contact representation for a person. Those having skill in the art would understand the desirability of having a user experience (UX) based contact merging system and software. This type of contact merging system and software would typically provide merging of conflicting data records through a common interface, without a loss of information from the original records, thus allowing improved usefulness of the software and remote devices that utilize the contact store.

Figure 2:
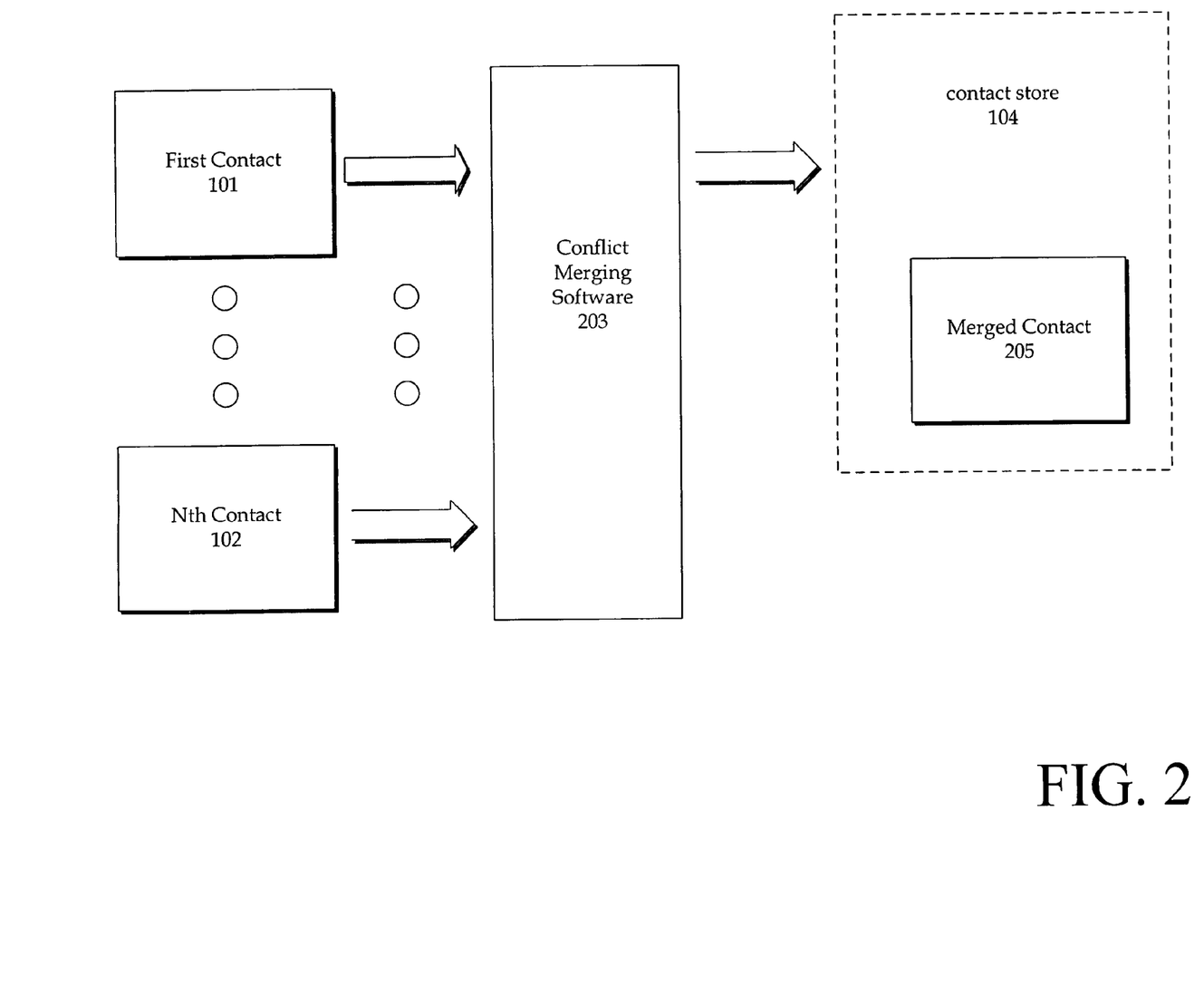
FIG. 2 is a block diagram illustrating an embodiment of a method of merging contacts to resolve conflicts between contacts, or data records.

FIG. 2 is a block diagram illustrating an embodiment of a method of merging contacts to resolve conflicts between contacts, or data records. Merging is typically the operation of retaining unique data by unifying one or more contacts into a single contact record for the person. Such a merged contact is termed a composite contact. Contact merging allows users to resolve conflicts when two or more contacts have different values for field that may only possess one true value are encountered (i.e. birthdate). The process may similarly resolve conflicts for fields that may have many valid values (i.e. telephone numbers).

In an embodiment of the invention contact merging software 203, processes a first contact 101, through an nth contact 102 of a plurality of contacts. As a result of the merging process 203 a single merged contact 205 is produced and retained in the data store 104.

The merged contact typically retains all of the unique information that may have been found in the data records that were selected for merging. In an embodiment fields that may only have a single value retain only the single value determined to be the true value. In another embodiment the conflicting values are retained just in case the user determines at a later time that the wrong value was selected. In a further embodiment, if the user finds that the merging process did not produce a single record to his liking he can unmerge the contacts and return them to their original form.

Figure 3:
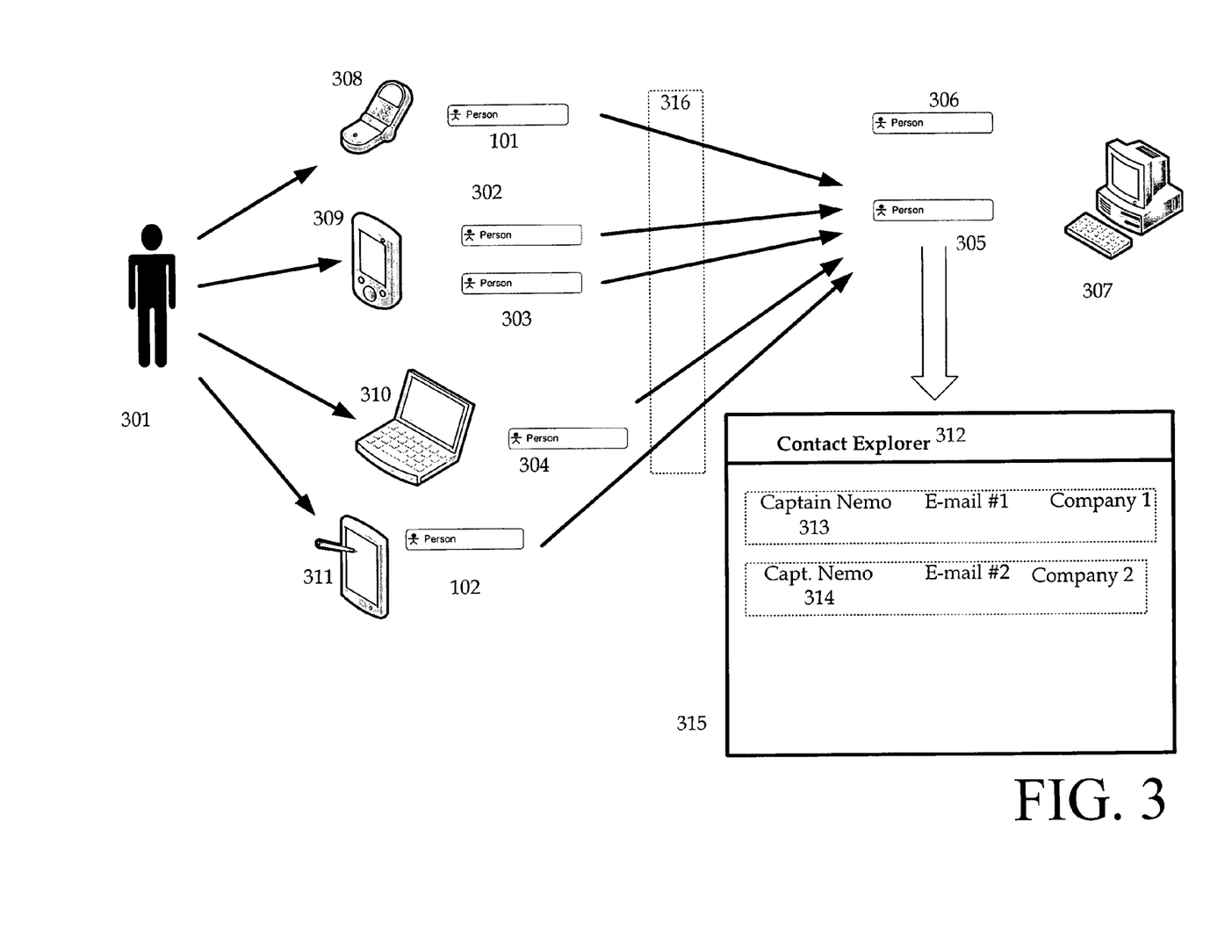
FIG. 3 is a block diagram illustrating the generation of multiple contacts to represent a single person on various devices, and the integration of multiple contacts into a single data store.

FIG. 3 is a block diagram illustrating the generation of multiple contacts to represent a single person on various devices, and the integration of multiple contacts into a single data store. In a common situation a single person 301, may be represented by a plurality of contacts, or data records, 101, 302, 303, 304, and 102. Each contact record may be stored on a corresponding electronic device 308, 309, 310, and 311. Each of the remote electronic devices 308, 309, 310, and 311 may have contact stores that typically exist on cell phones, PDAs, remote servers, application specific contact stores not part of the exemplary contact store, and the like.

In the example shown a first contact 101 is stored on a cellular telephone 308. Other multiple contacts 302, and 303 for the same person are stored on a first PDA 309. Data records 302 and 303 represent the same person and may be duplicates, different versions for the same person 301, or any other type of data record that may typically arise when a person creates a conflicting data record. Such data records can be created either intentionally or by accident. Another data record 304 for the same person 301 is stored on a laptop computer 310. And the nth data record 102 is stores on a second PDA 311.

Those skilled in the art will appreciate that any number of devices capable of storing contact information may be used to store contact data. Likewise those skilled in the art will realize that on any device any number of contacts representing a single person may be stored. Those skilled in the art will also appreciate that person 301 may be equivalently interpreted to mean business entities such as stores, groups corporations, social organizations and the like.

Typically the various devices do not share a common data record format and may need synchronization to produce a common conventionally understood data record format. The sync adapter typically moves contact information between a data source and a contact store. A sync adapter 316 may be constructed by conventional methods known to those skilled in the art to produce data records, or contacts that have common formatting. Those skilled in the art will appreciate that not all of the electronic devices will need synchronization, as the data formats produced in such an instrument are already compatible with the ultimate data format used by in the contact store, or its equivalent, that it is desired to conform the records to so that they may be kept in that contact store.

Computer 307 contains the contact store and the software that is used to merge the contacts 101, 302, 303, 304, and 102 into a single contact 305. Computer 307 may also contain a data store of its own that has one or more conflicting data records 306 that will be merged with the other contacts into contact 305. In the embodiment shown the software for merging the contacts resides in the processor and memory of computer 307. For example the operating system used by computer 307 may be an operating system, or equivalent software capable of utilizing a contact store.

Likewise laptop computer 310 may also contain a contact, or data, store of its own. For example the operating system used by laptop computer 310 may be an operating system, or equivalent software capable of utilizing a contact store. It is contemplated that when the computers 310 and 307 are running with the same operating system, and known sync relationships, that contacts from either machine can be merged to update the contacts on either machine.

A graphical user interface ("GUI") 315 displays contact information in a contact explorer application 312 that is displayed on computer 307. Shown in the GUI are more detailed representations of two contacts that would typically be considered duplicates 313, 314. The names are similar, but not exact matches. Each record apparently represents the same person, but may contain differing information. For example the records may contain differing e-mail addresses, or different company names.

Figure 4:
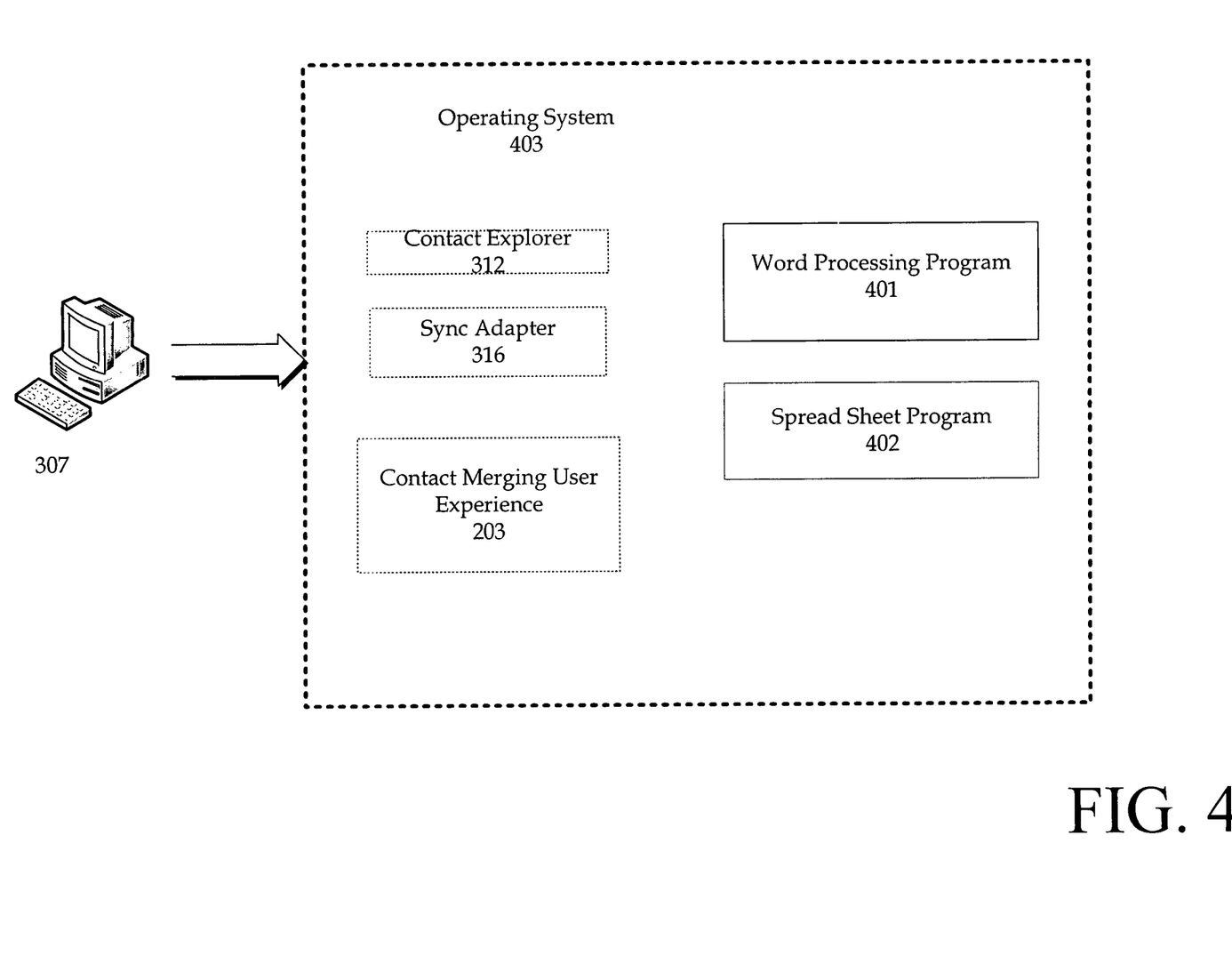
FIG. 4 is a block diagram showing an embodiment of the location of contact merging software in relation to an operating system software, sync adapter software, contact explorer software, and other application programs.

FIG. 4 is a block diagram showing the location of a contact merging software in relation to an operating system, sync adapter software, contact explorer software, and other application programs. As will be appreciated by those skilled in the art the conventionally constructed computer 307, includes an operating system 403 that may include various features 312, 316, 203 and applications 401, 402. Those skilled in the art will also appreciate that the various components of the operating system may be distributed to other processors networked to computer 307 and accessed remotely.

Figure 5:
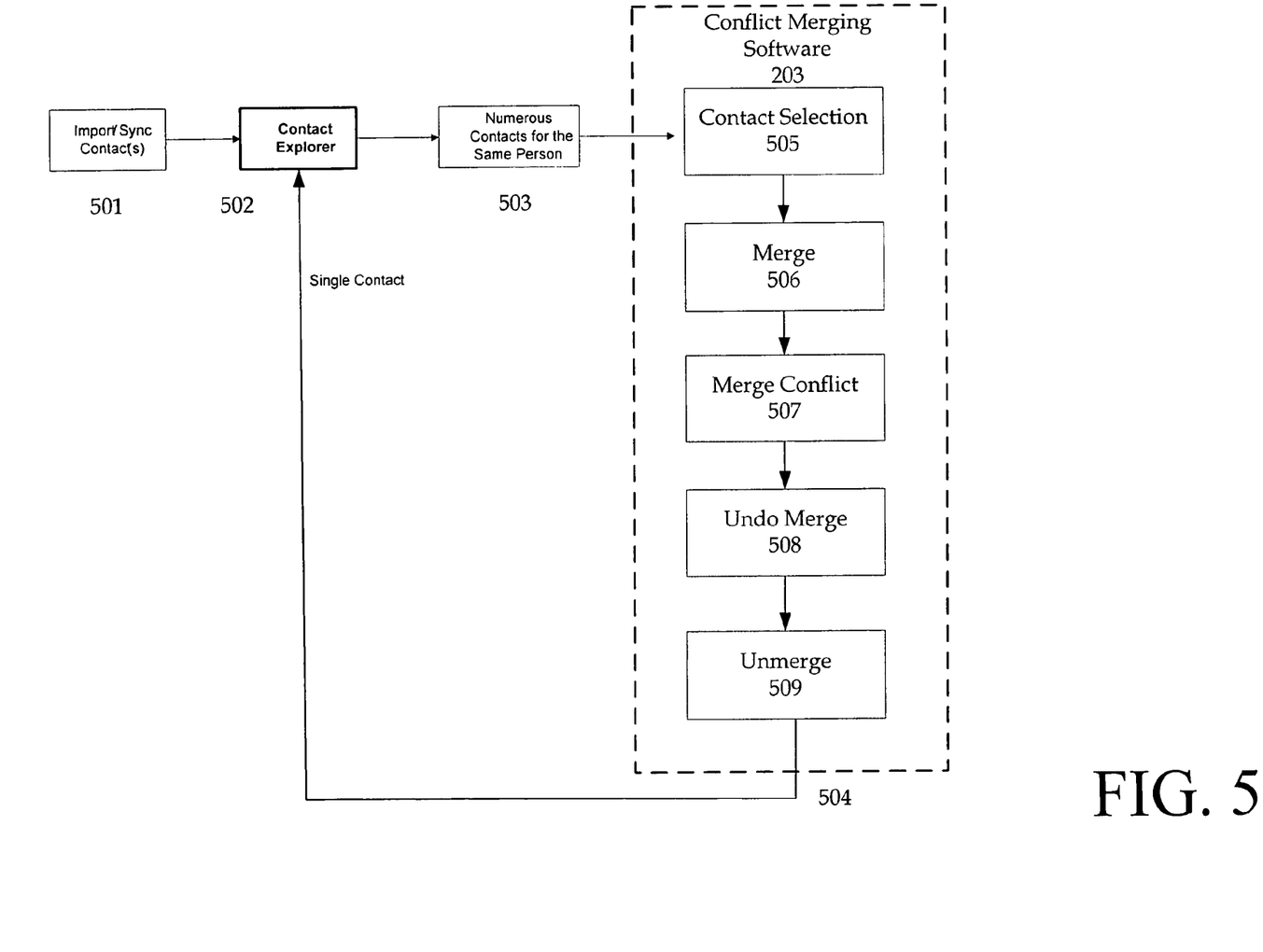
FIG. 5 is a block diagram illustrating an overview of the process of contact merging.

FIG. 5 is a block diagram illustrating an overview of the process of contact merging. The contact merging software feature allows multiple contacts relating to the same one person to be merged into a single contact record as shown in the figure. When the merge process is complete, there is only a single representation of the real world contact. This representation contains all unique values from all merged contacts. In other words, all unique names, phone numbers, email addresses, etc. will be found on the single contact. While maintaining this single representation, any representations on remote stores are maintained in their original form. This eliminates the need to manage multiple contact representations.

In the merging process a deep-merge is typically a merging process in which invisible contact metadata is also merged. Those skilled in the art will appreciate that metadata typically includes sync relationships, business logic, communication history, and the like. The overall contact merge process may include four processes: Contact selection (including alternative embodiments having auto-suggest for merge) 505, merge 506, merge conflict process 507, undo merge 508 and unmerge 509. For example a first contact for a person includes the person's telephone number, without area code and metadata. A second contact for the person includes the person's telephone number with area code and no metadata. The merge process results in a merged contact record including telephone number with area code and the meta data.

The contact selection including an auto-suggest merge process 505 is the process that occurs when two or more contacts appear to meet assigned criteria for a merge. For example, when a new contact has the same phone number and name as an already existing contact this situation may be taken care of by the auto-suggest merge process. Contact selection merely alerts the user to the possibility that there may be one or more possible contacts for the same person. The user determines whether the merge happens.

The merge process 506 is the process used to combine contacts when two or more contacts represent the same real world person. The merge process combines the information from the selected contacts into a single entry in the user's contact store. The selected contacts may be manually selected or selected with the auto suggest process 505. Typically through a GUI (graphical user interface), a user activates a contact picker dialog to determine which contacts to merge. The GUI may display an animation of the at least two contacts of the plurality of contacts merging. The user may access the merge process from any contact store. Those skilled in the art will recognize the applicability to contact stores such as a contact library, details page, contact control, sidebar tile, or the like. The merge process can also be called from any conventionally constructed 3rd party application.

The merge process 506 displays the details of the merge when completed in a GUI. This allows the user to re-order collections of values, such as phone numbers and email addresses, and allows the user to determine which of the values in the collection should be used by default by ordering that value to the top of the collection.

In the merge conflict process 507 utilizes user interaction when the merge process results in more than one value for a single-values property, such as birthdate. Processing may halt and the user determines what value is kept, or the conflict may be logged for later presentation to the user through a common conflict resolution user interface.

Remote stores may initiate an update process periodically. This may present problems when the remote store seeks to update the user's contact store, which would effectively undo the user's merge. In the case of the originator being a one-way sync remote store, such as a corporate or internet directory, the system "remembers" that the remote store's value was not used, and does not allow the store to continue attempting to update the merged contact upon further sync actions.

For example, suppose that a person's birthdate is incorrectly listed in the Internet White Pages, and the birthdate is correctly entered in the corporate directory. When the user merges in the contact information from both remotes sources, only one of those birthdates can be accepted as the one for the merged contact. If the user chooses the correct birthdate originating from the corporate directory, the users operating system will remember that the birthday from the Internet White Pages was not used, and will not continue to try and merge in that specific value the next time the Internet White Pages is sync-ed to the user's computer or other device having a contact store.

The undo Merge process 508 is the process initiated at the time that the merge is completed to restore the original multiple contacts to their pre-merge state. As is typical with undo actions, and recognized by those skilled in the art, the undo merge process is available at the time that the merge occurs. Once the merged contact is accepted and another task is started, Undo is no longer available.

The unmerge 509 process may be initiated after a merge has been completed and Undo Merge is no longer available. Unmerge will restore the contact to its original contact parts. When this process is utilized any changes that were made to the contact post-merge are lost.

At block 501 a set of contacts selected for merging are imported. The imported contacts may have been synced as previously shown (316, of FIG. 3). At block 502 the selected contacts are imported into a contact management program (312, of FIG. 3) such as the exemplary contact explorer. At block 503 numerous contacts (313, 314, of FIG. 3) for the same person are selected from the multitude of contacts previously imported at block 501. At block 504 the contact merging program (203, of FIG. 2) is activated to create a single representation of a person in a new merged data record or contact. The new merged contact is then returned to the contact explorer 312.

Figure 6:
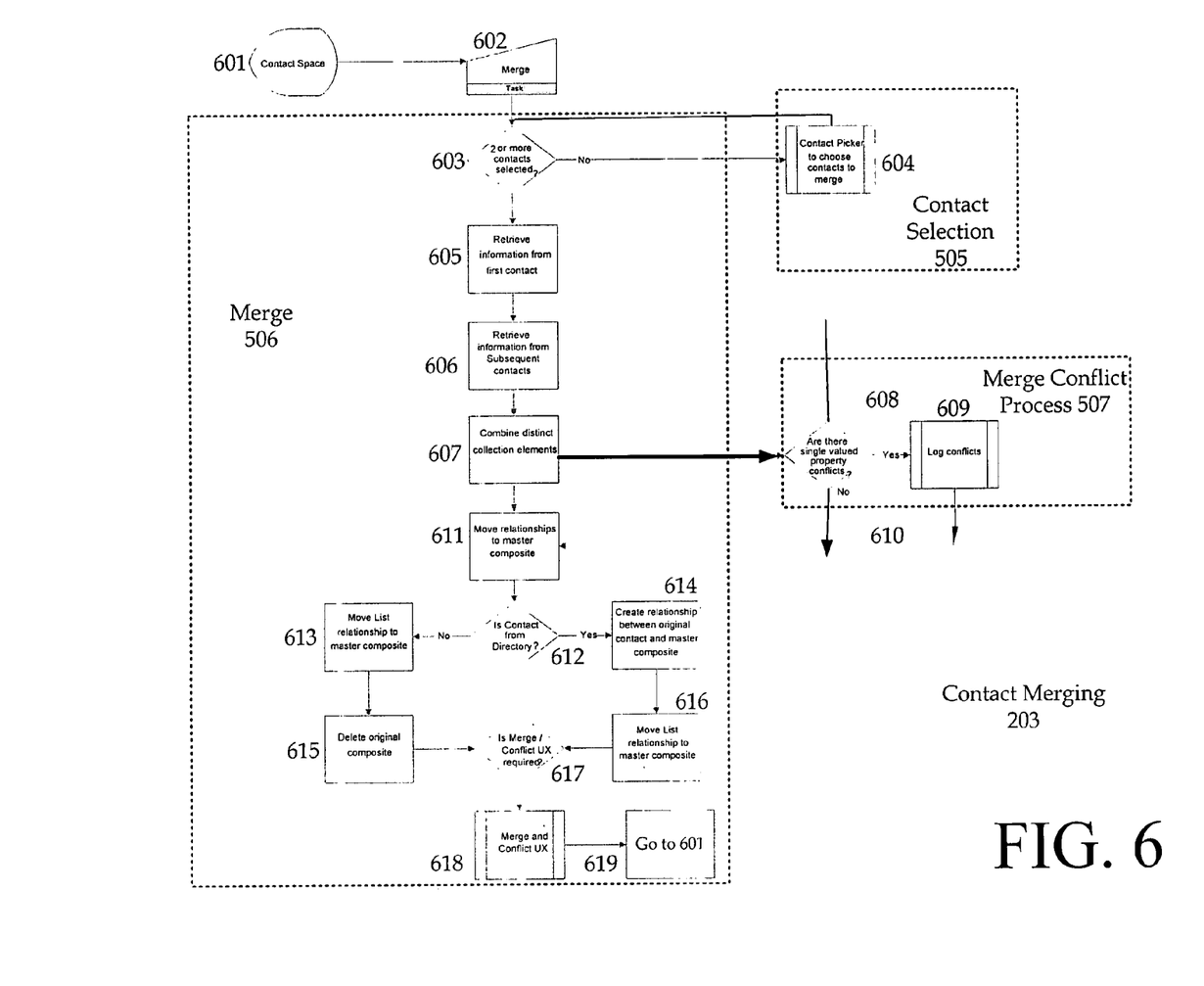
FIG. 6 is a block diagram illustrating an embodiment of the process of contact merging.

FIG. 6 is a block diagram illustrating an embodiment of the process of contact merging 203. At block 601 a conventional contact space, or contact store, is accessed. Access is typically achieved by a user selecting a merge process from the user interface of an application program. A contact store may contain various contacts that have been brought in by the use of a conventionally constructed sync adapter that includes the processing ability to conform contacts that originate from other sources to the format utilized by the contact store.

At block 602 the contact merging task is initiated. At block 603 the process makes an inquiry to see if two or more conflicts are selected for merging. If several contacts have not been selected for merging at block 603, a conventionally constructed conflict picker is invoked to allow the user to choose the contacts to merge at block 604. If multiple contacts have been selected at block 603, then typically all information on a first contact of the selected group is retrieved from contact stores in block 605. In an alternative embodiment an auto-suggest routine may be provided to automatically select potential contacts for merging.

At block 606 information on the remaining contacts is retrieved. At step 607 the process switches from operations on contacts to operations on the properties of contacts. At block 607 distinct collection elements are combined. At this point each contact or data record is examined, and if there is a blank field in the master contact record, or the contact that information is being merged into, then the field is filled. Next the process evaluates the contacts to determine how to merge conflicting information into a single contact.

Blocks 608 and 609 are included in the block of combining distinct collection elements 607. At block 608 an inquiry is made to determine if there are any single valued property conflicts. A single valued property is information that is associated with a person that has only one value. For example one's birthday, display name or gender are typically considered single valued properties. In an embodiment a conflict User Interface (UI), is only displayed for a contact's gender and display name. Examples of a multi-valued property could be telephone numbers, or addresses.

If there appear to be single valued property conflicts at block 608 the process proceeds to block 609 where the conflict is noted in a log to be handled by a conflict resolution user interface. As an example the user picks a value to be used. In an alternative embodiment the single valued properties not selected by a user are retained, unless the user requests that they be overwritten. Picking a contact by the user is done by displaying a conventionally constructed user interface (UI), with which the user interacts. Then at 610 the process proceeds to block 611 to resume processing.

If there is not a single valued property conflicts at block 608 the process proceeds to block 611 where a master composite contact is made up to include all of the contact information moved into a merged contact, with typically all relationships pointing to the single contact. No data is lost when the contact records are merged. In addition, multi valued properties in the real world are accurately reflected in the merged contact record. Thus, a plurality of telephone numbers, e-mail addresses and the like are possible.

Next, at block 612 the process determines if the contact is from a directory, active directory, corporate directory, corporate address book, read only source or the like. In alternative embodiments the sync adapter is typically responsible for keeping the form of the original contact as it was found in the directory. There is a divergence in the flow at this point because block 615 is followed when the contact is not from a directory service. Those skilled in the art will recognize this type of directory as the type that allows a user access and copy privileges, but does not allow the user to write information to the directory or address book. If the contact is taken from a directory (or equivalently a remote contact store or the like), it is typically desirable to maintain the contact in the directory, without changes. This is done by establishing a relationship between the contact in the directory and the master composite contact, or merged contact being created. This branch of the process addresses the situation in which a user may have contact information for a person that they trust more than the data from the directory.

If the contact is not from the directory then at block 613 then the list of relationships for the contact are moved to the master composite. Block 616 is typically redundant to block 613. There the merged contact is added to all of the lists to which the original contacts were members of. For example business contacts, personal contacts and the like. Next, the process proceeds to block 615 where the original composite is deleted if the original contact is not from a read only source.

Returning to block 612, if the contact is from the directory then a relationship is created between the directory and the master composite at block 614 to protect the master composite contact from updates from the directory, and to maintain the integrity of the contact in the directory. In block 616 after the relationships are created, they are moved to the master composite contact. In an alternative embodiment blocks 614 and 616 are omitted.

At block 617 the process initiates a merge and conflict interface where users interact with one or more of a plurality of displays or graphical user interfaces (GUI's) to complete the merge process. At block 619 control of the process is returned to the calling operation. The user is returned back to the original launch point of the merge, and the merged entity is written to the contact store.

Figure 7:
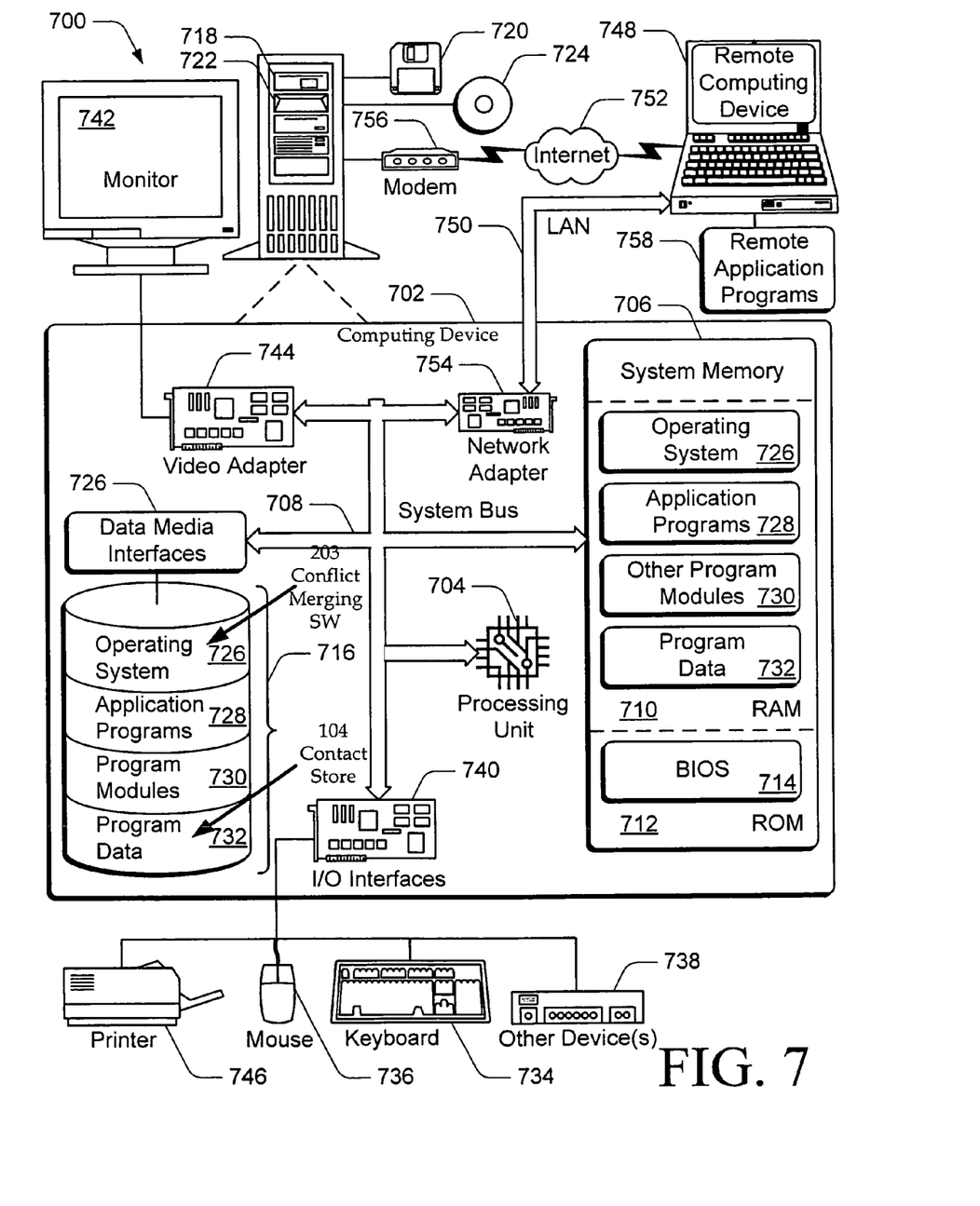
FIG. 7 is a block diagram of an embodiment of a computer system, or server system for performing the process of contact merging.

FIG. 7 is a block diagram of an embodiment of an exemplary computer system, or environment, 700, for performing the process of contact merging. The software, user interface systems, computing, network, and system architectures described in this application, can be either fully or partially implemented in such a computer system. Exemplary computing environment 700 is only one example of a computing system and is not intended to suggest any limitation as to the scope of use or functionality of the architectures. Neither should the computing environment 700 be interpreted as having any dependency or requirement relating to any one or combination of components illustrated in the exemplary computing environment 700.

The computer and network architectures in computing environment 700 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

A conventionally constructed computing device, or computer, 702 may include, but are not limited to, one or more conventionally constructed processors 704 (e.g., any of microprocessors, controllers, and the like), a conventionally constructed system memory 706, and a conventionally constructed system bus 708 that couples the various system components.

The one or more conventionally constructed processors 704, process an operating system, or various computer executable instructions, to control the operation of computing device 702 and to communicate with other electronic and computing devices. The system bus 708 represents any number of the several types of conventionally constructed bus structures, including a memory bus or memory controller, a peripheral bus, an accelerated graphics port, and a processor or local bus using any of a variety of bus architectures.

A variety of conventionally constructed computer readable media are included in the computer system or environment, or system 700. The computer readable media can be any media that is accessible by computing device 702, and includes both volatile and non-volatile media, removable and non-removable media. The conventionally constructed system memory 706 includes computer-readable media in the form of volatile memory, such as random access memory (RAM) 710, and/or non-volatile memory, such as read only memory (ROM) 712. A basic input/output system (BIOS) 714 maintains the basic routines that facilitate information transfer between components within computing device 702, such as during start-up, and is stored in ROM 712. RAM 710 typically contains data and/or program modules that are immediately accessible to and/or presently operated on by one or more of the processors 704.

Computing device 702 may include other conventionally constructed removable/non removable, volatile/non-volatile computer storage media. By way of example, a hard disk drive 716 reads from and writes to a non-removable, non-volatile magnetic media (not shown), a magnetic disk drive 718 reads from and writes to a removable, non volatile magnetic disk 720 (e.g., a "floppy disk"), and an optical disk drive 722 reads from and/or writes to a removable, non-volatile optical disk 724 such as a CD ROM, digital video disk (DVD), or any other type of optical media. In this example, the hard disk drive 716, magnetic disk drive 718, and optical disk drive 722 are each connected to the system bus 708 by one or more conventionally constructed data media interfaces 726. The disk drives and associated computer readable media provide non volatile storage of computer readable instructions, data structures, program modules, and other data for computing device 702.

Any number of program modules can be stored on the hard disk 716, magnetic disk 720, optical disk 724, ROM 712, and/or RAM 710, including by way of example, an operating system 726, one or more application programs 728, other program modules 730, and program data 732. In the embodiment shown the conflict merging software 203 may reside on the hard disk 716 as part of the operating system 726. The data records or contacts 104, may be stored as part of the program data 732. Each of such operating system 726, application programs 728, other program modules 730, and program data 732 (or some combination thereof) may include an embodiment of the systems and methods described in this patent application.

Computing device 702 can include a variety of conventionally constructed computer readable media identified as communication media. Communication media typically embodies, or has recorder upon it, computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 702 via any number of different conventionally constructed input devices such as a keyboard 734 and pointing device 736 (e.g., a "mouse"). Other input devices 738 (not shown specifically) may include a microphone, joystick, game pad, controller, satellite dish, serial port, scanner, and/or the like. These and other input devices are connected to the processors 704 via input/output interfaces 740 that are coupled to the system bus 708, but may be connected by other interface and bus structures, such as a parallel port, game port, and/or a universal serial bus (USB).

A conventionally constructed monitor 742 or other type of display device can be connected to the system bus 708 via an interface, such as a video adapter 744. The monitor may display information to a user as either text or through a graphical user interface (GUI). In addition to the monitor 742, other conventionally constructed output peripheral devices can include components such as speakers (not shown) and a printer 746 which can be connected to computing device 702 via the input/output interfaces 740.

Computing device 702 can operate in a conventionally constructed networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computing device 702.

Logical connections between computing device 702 and the remote computing device 748 are depicted as a local area network (LAN) 750 and a general wide area network (WAN) 752. Such conventionally constructed networking environments are commonplace in offices, enterprise-wide computer networks, intranets, and the Internet. When implemented in a LAN networking environment, the computing device 702 is connected to a local network 750 via a network interface or adapter 754. When implemented in a WAN networking environment, the computing device 702 typically includes a modem 756 or other means for establishing communications over the wide area network 752. The modem 756, which can be internal or external to computing device 702, can be connected to the system bus 708 via the input/output interfaces 740 or other appropriate mechanisms. The illustrated network connections are exemplary and other means of establishing communication link(s) between the computing devices 702 and 748 can be utilized.

In a networked environment, such as that illustrated with computing environment 700, program modules depicted relative to the computing device 702, or portions thereof, may be stored in a remote memory storage device. By way of example, remote application programs 758 are maintained with a memory device of remote computing device 748. For purposes of illustration, application programs and other executable program components, such as the operating system 726, are illustrated herein as discrete blocks, although it is recognized that such programs and components reside at various times in different storage components of the computing device 702, and are executed by the processors 704 of the computing device.

Figure 8:
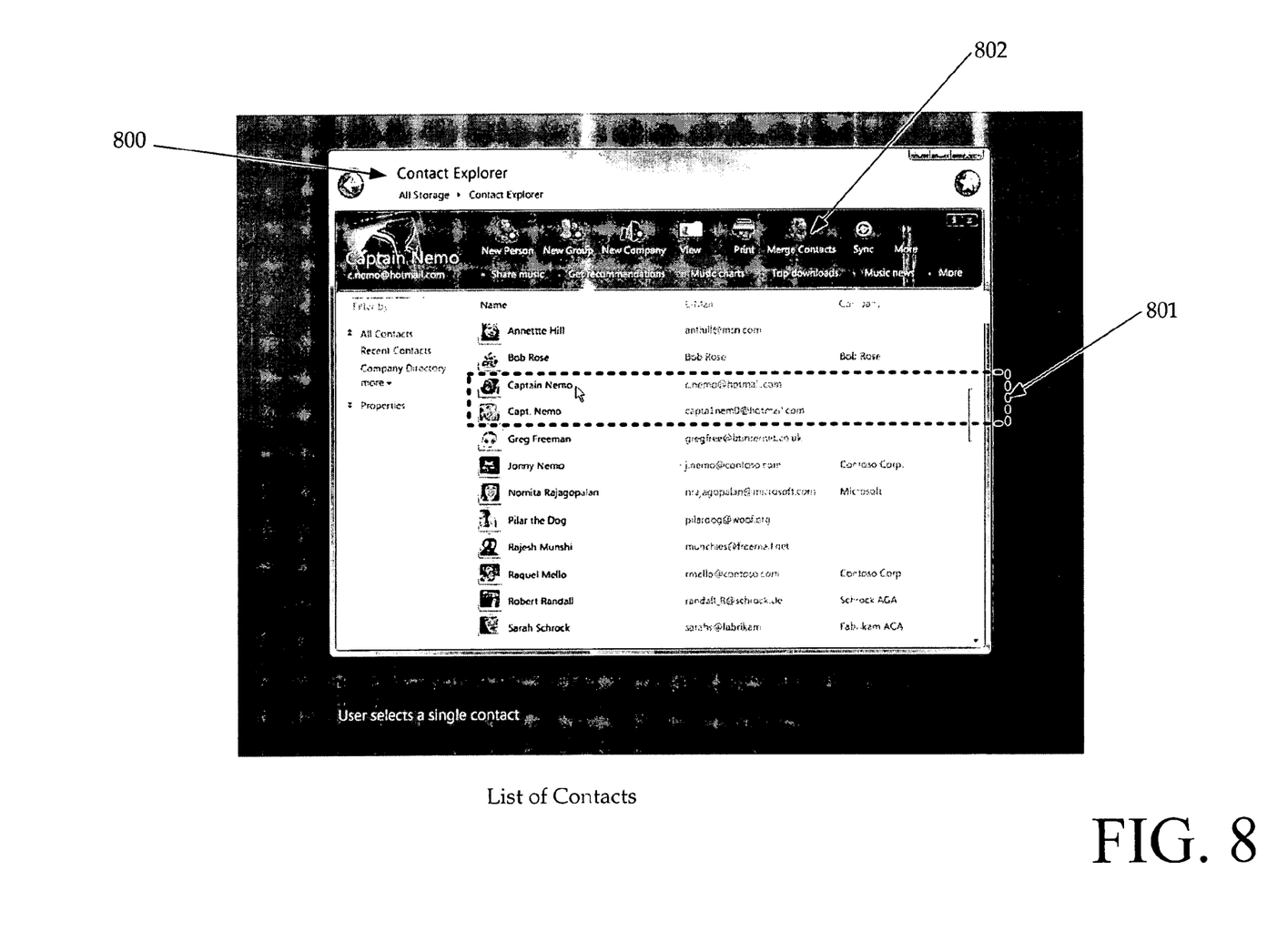
FIG. 8 is a diagram illustrating a graphical user interface (GUI) for selecting a contact in a contact management program.

FIG. 8 is a diagram illustrating a graphical user interface (GUI) for selecting a contact in a contact management program. When there are duplicate entries of contact information for a person in their contact management software program a display as shown, or its equivalent may be used to select contacts to merge. The contacts could have came from different sources, or simply be duplicates entered at different times. The user selects one or more contact to merge by a mouse click, keyboard entry or their equivalent 801. The user next initiates the merge process by selecting the merge contact button 802. The initiation of merge contact may be done in alternative embodiments by keyboard entry or equivalent methods.

Figure 9:
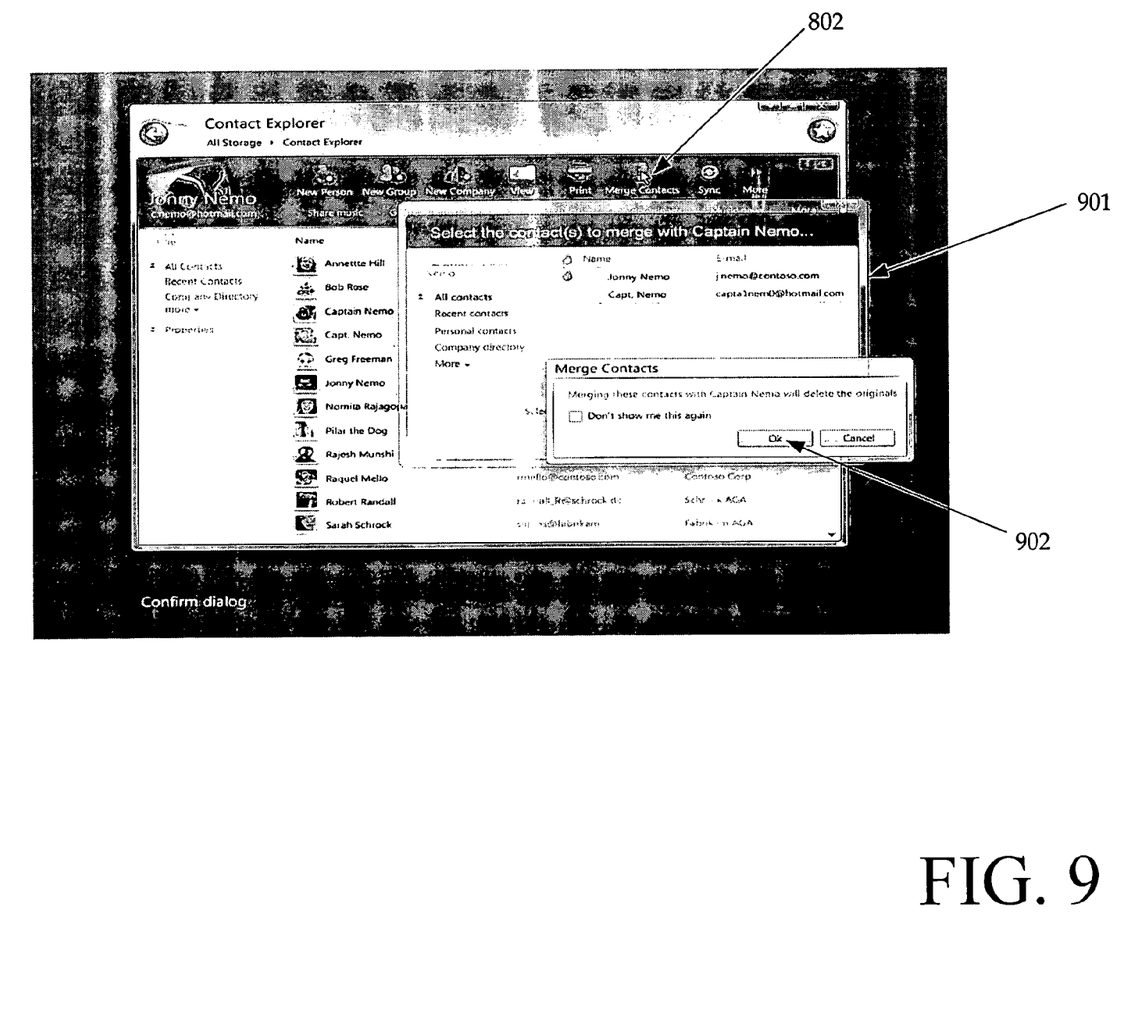
FIG. 9 is a diagram illustrating a graphical user interface (GUI) for confirming a selection of contacts prior to performing a contact merging process.

FIG. 9 is a diagram illustrating a graphical user interface (GUI) for confirming a selection of contacts prior to performing a contact merging process. Clicking the contact merge button 802 initiates a contact picker dialog (CPD). The CPD displays all of the contacts that have the same first name, the same last name, or the same first and last name 901. The user selects, by mouse click or equivalent, the contacts to be merged from the list. Next, the user clicks OK, by a mouse click or its equivalent 902. The user is asked which name to use for the display.

Figure 10:
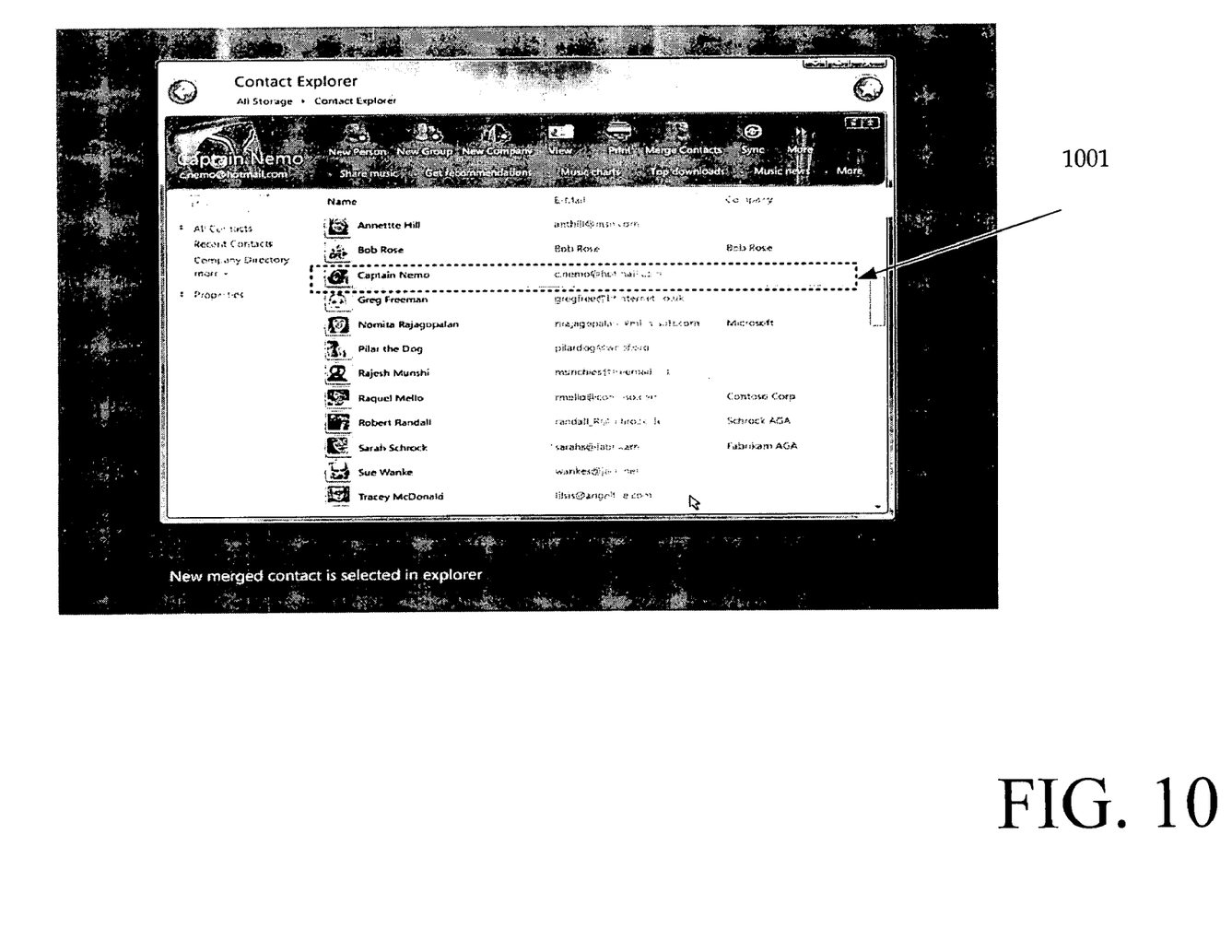
FIG. 10 is a diagram illustrating a graphical user interface (GUI) showing the final merged contact.

FIG. 10 is a diagram illustrating a graphical user interface (GUI) showing the final merged contact. The final merged contact with the display name previously selected is displayed 1001. On this page information may be ordered to suit a users needs. For example if a person travels frequently and has, say 20 business telephone numbers, a user may want to select which one is displayed as a default telephone. Alternatively a user may wish to choose a display order by re-ordering the values within the list. In alternative embodiments of the GUIs a right click menu is constructed using conventional methods known to those skilled in the art so that a property page for a contact will appear showing desired details for a particular contact.

The invention claimed is:

1. A method of merging contact information received from multiple sources comprising the acts of:
    identifying a first data record in a contact store including a first information content as representing a contact and having been received from a remote store:
    identifying a second data record in the contact store, having a second information content differing from the first data record, and representing the contact;
    merging the first data record and the second data record into a single contact record stored in the contact store, at least one multi-valued field in the single contact record containing values from both the first data record and the second data record, and wherein the merging comprises determining that the first data record includes an incorrect value for a single-values property of the contact and the second data record includes a correct value for the single-values property of the contact, including the correct value in the single contact record, omitting the incorrect value from the single contact record, and storing an indication that the first data record from the remote store contains an incorrect value of the single-values property;
    removing the first data record and the second data record from the contact store;
    subsequent to the merging, receiving the first data record from the remote store;
    determining that the first data record, received subsequent to the merging, came from the remote store; and
    based on the determining and the stored indication, ignoring the incorrect value and merging the first data record, received subsequent to the merging, into the single contact record without the incorrect value;
    wherein the acts of identifying the first data record, identifying the second data record, merging the first data record, removing, receiving, determining, and merging the first data record received subsequent to the merging, are performed by at least one processor.

2. The method of merging contact information received from multiple sources of claim 1, in which the single contact record includes the first information content and the second information content.

3. The method of merging contact information received from multiple sources of claim 1, in which the first data record originates from a first remote store and the second data record originates from a second remote store.

4. The method of merging contact information received from multiple sources of claim 3, further comprising the acts of:
    maintaining a representation of the first data record in the first remote store; and
    maintaining a representation of the second data record in the second remote store.

5. The method of merging contact information received from multiple sources of claim 3, comprising an additional act of merging the first data record to be compatible with the data record of the second data record of the second remote store.

6. The method of merging contact information received from multiple sources of claim 3, where the first remote store is not part of a client contact store.

7. The method of merging contact information received from multiple sources of claim 1, where merging is a unification of a plurality of contacts that refer to a same person that results in one contact record for one person.

8. The method of merging contact information received from multiple sources of claim 1, where a contact is a single person.

9. The method of merging contact information received from multiple sources of claim 1, where a contact is a single group.

10. The method of merging contact information received from multiple sources of claim 1, where a contact is a single organization.

11. The method of merging contact information received from multiple sources of claim 1, where a contact is stored in a client contact store.

12. The method of merging contact information received from multiple sources of claim 1, comprising a further step of resolving conflicts between the first data record and the second data record.

13. The method of merging contact information received from multiple sources of claim 1, comprising an additional step of forming a composite from merging the first data record and the second data record into a single contact record.

14. The method of merging contact information received from multiple sources of claim 1, wherein:
    merging is initiated after a synchronization process; and
    merging is based on received user input.

15. The method of merging contact information received from multiple sources of claim 1, wherein the first data record and the second data record are manually selected.

16. In a computer system having a graphical user interface including a display and a user interface selection device, a method of interacting with a user to merge contacts comprising:
    displaying a plurality of contacts from a contact store;
    receiving an indication to merge at least two contacts of the plurality of contacts;
    merging the at least two contacts to result in a merged contact, wherein the merging comprises determining that at least one of the at least two contacts includes an incorrect value for a single-values property, determining that the at least one contact including the incorrect value for the single-values property came from a remote store, storing an indication that the at least one contact including the incorrect value for the single-values property came from the remote store, and omitting the incorrect value from the merged contact;

saving the merged contact, at least one multi-valued field in the merged contact containing values from at least two contacts of the at least two contacts;

removing at least one of the plurality of contacts from the contact store;

receiving a contact from the remote store;

determining that the contact received from the remote store contains the incorrect value for the single-values property, and in response to the determining and based on the stored indication, preventing the contact received from the remote store from being merged with the merged contact.

17. The computer system having a graphical user interface including a display and a user interface selection device, a method of interacting with a user to merge contacts of claim 16 further comprising, displaying an animation of the at least two contacts of the plurality of contacts merging.

18. The computer system having a graphical user interface including a display and a user interface selection device, a method of interacting with a user to merge contacts of claim 16, in which the merged contact includes all multi-valued information from the at least two contacts.

19. The computer system having a graphical user interface including a display and a user interface selection device, a method of interacting with a user to merge contacts of claim 16, in which the merged contact includes all of the multi-valued information from the plurality of contacts.

20. The computer system having a graphical user interface including a display and a user interface selection device, a method of interacting with a user to merge contacts of claim 16, the method including a step of merging all multi-valued information from the plurality of contacts.

21. A method of merging contact data comprising:

merging a plurality of contact data records stored in a contact store into a composite merged contact, wherein at least one multi-valued field in the composite merged contact contains values from at least two of the plurality of contact data records;

identifying conflicting single valued data in the plurality of contact data records;

resolving conflicting single valued data fields from the plurality of contact data records into the composite merged contact, wherein the resolving includes creating a log, querying a user to select a retained single-valued data field from a plurality of conflicting single-valued data fields contained in the log, including the retained single-valued data field in the merged contact;

storing an indication that the non-selected single-valued data fields from the plurality of conflicting single-valued data fields came from at least one specific source and were rejected by the user:

storing the composite merged account in the contact store;

archiving the plurality of contact data records;

receiving a contact record from the at least one specific source;

determining that the contact record received from the at least one specific source includes a single-valued data field identified in the stored indication; and in response to the determining, preventing the contact record received from the at least one specific source from being merged into the composite merged contact;

wherein the merging, identifying, resolving, receiving, determining, and preventing are performed by at least one processor.

22. A data processing system configured to communicate with an external network comprising:

a first processor of a remote contact store;

a first memory coupled to the first processor and comprising program instructions stored thereon, the processor being configured to execute the program instructions, the program instructions including instructions that when executed cause the first processor to perform:

receiving a contact record;

storing the contact record; and transmitting the contact record;

a second processor of a contact store;

a second memory coupled to the second processor and comprising program instructions stored thereon, the processor being configured to execute the program instructions stored on the second memory, the program instructions stored on the second memory including instructions that when executed by the second processor cause the second processor to perform:

receiving the contact record transmitted from the first memory;

storing the received contact record in the second memory;

finding a conflicting contact record stored in the second memory;

merging the conflicting contact record with the received contact record to form a composite merged contact, wherein the merging comprises determining that the received contact record includes an incorrect value for a single-values property of the contact and omitting the incorrect value from the composite merged contact;

storing the merged contact in the second memory;

storing an indication that the received contact record includes the incorrect value for the single-values property of the contact, the indication also identifying a source of the received contact record;

removing the received contact record and the conflicting contact record from the second memory;

receiving an other contact record transmitted from the first memory;

determining that the other contact record originated from the source identified in the stored indication; and in response to the determining, preventing the other contact record from being merged with the composite merged contact.

23. The data processing system adapted to communicate with an external network of claim 22, in which the second memory further includes program instructions to synchronize the contact record retrieved from the first memory to be compatible with the conflicting contact record.

24. The data processing system adapted to communicate with an external network of claim 22, in which the first processor and first memory are part of a PDA.

25. The data processing system adapted to communicate with an external network of claim 22, in which the first processor and first memory are part of a cellular telephone.

26. The data processing system adapted to communicate with an external network of claim 22, in which the first processor and first memory are part of a computer.

27. The data processing system adapted to communicate with an external network of claim 22, in which the first processor and first memory are part of a remote electronic device.

28. The data processing system adapted to communicate with an external network of claim 22, in which the second processor and second memory are part of a computer.

29. A computer readable storage medium comprising computer program instructions stored thereon that, when executed by at least one computer, cause the at least one computer to perform:

displaying a plurality of contacts from a contact store;

receiving an indication to merge at least two contacts of the plurality of contacts;

merging the at least two contacts to result in a merged contact, wherein the merging comprises determining that at least one of the at least two contacts includes an incorrect value for a single-values property, determining that the at least one contact including the incorrect value for the single-values property came from a remote store, storing an indication that the at least one contact including the incorrect value for the single-values property came from the remote store, and omitting the incorrect value from the merged contact;

saving the merged contact, at least one multi-valued field in the merged contact containing values from at least two contacts of the at least two contacts;

removing at least one of the plurality of contacts from the contact store;

receiving a contact from the remote store;

determining that the contact received from the remote store contains the incorrect value for the single-values property, and in response to the determining and based on the stored indication, preventing the contact received from the remote store from being merged with the merged contact.

30. The computer readable storage medium of claim 29, wherein the merged contact includes all multi-valued information from the at least two contacts.

31. The computer readable storage medium of claim 29, wherein the merged contact includes all of the multi-valued information from the plurality of contacts.

* * * * *

UNITED STATES PATENT AND TRADEMARK OFFICE
CERTIFICATE OF CORRECTION

| | | |
|---|---|---|
| PATENT NO. | : 7,739,246 B2 | Page 1 of 1 |
| APPLICATION NO. | : 10/966527 | |
| DATED | : June 15, 2010 | |
| INVENTOR(S) | : Stephen John Mooney et al. | |

It is certified that error appears in the above-identified patent and that said Letters Patent is hereby corrected as shown below:

In column 13, line 51, in Claim 21, delete "user:" and insert -- user; --, therefor.

Signed and Sealed this
Fifteenth Day of February, 2011

David J. Kappos
*Director of the United States Patent and Trademark Office*